US010579944B2

(12) United States Patent
Chen

(10) Patent No.: US 10,579,944 B2
(45) Date of Patent: Mar. 3, 2020

(54) SYSTEM AND METHOD FOR RESERVING A PARKING SPACE

(71) Applicant: Shuang Chen, Somers, NY (US)

(72) Inventor: Shuang Chen, Somers, NY (US)

(73) Assignee: OP40 HOLDINGS, INC., Somers, NY (US)

( * ) Notice: Subject to any disclaimer, the term of this patent is extended or adjusted under 35 U.S.C. 154(b) by 801 days.

(21) Appl. No.: 14/624,341

(22) Filed: Feb. 17, 2015

(65) Prior Publication Data

US 2015/0235148 A1    Aug. 20, 2015

Related U.S. Application Data

(60) Provisional application No. 61/940,751, filed on Feb. 17, 2014.

(51) Int. Cl.
*G06Q 10/02* (2012.01)
*G06Q 20/14* (2012.01)

(52) U.S. Cl.
CPC ............ *G06Q 10/02* (2013.01); *G06Q 20/14* (2013.01)

(58) Field of Classification Search
CPC .............................. G06Q 10/02; G06Q 20/14
USPC ............................................................. 705/5
See application file for complete search history.

(56) References Cited

U.S. PATENT DOCUMENTS

| 9,135,580 | B1 * | 9/2015 | Lyman ................... G06Q 10/02 |
| 2002/0077953 | A1 | 6/2002 | Dutta |
| 2004/0254840 | A1 * | 12/2004 | Slemmer ................ G06Q 10/02 705/22 |
| 2005/0182671 | A1 * | 8/2005 | Miyauchi ............... G06Q 30/06 705/5 |
| 2007/0150336 | A1 * | 6/2007 | Boily ..................... G07B 15/00 705/13 |
| 2012/0265585 | A1 * | 10/2012 | Muirbrook ............. G06Q 20/20 705/13 |
| 2013/0143536 | A1 | 6/2013 | Ratti |
| 2013/0346121 | A1 * | 12/2013 | Shealy ................... G06Q 10/02 705/5 |

(Continued)

OTHER PUBLICATIONS

Arif et. al. Datacenter at the Airport: Reasoning about Time-Dependent Parking Lot Occupancy, IEEE Transactions on Parallel and Distributed Systems, vol. 23, No. 11, Nov. 2012 (Year: 2012).*

*Primary Examiner* — Kevin H Flynn
*Assistant Examiner* — Emmett K. Walsh
(74) *Attorney, Agent, or Firm* — Benjamin Aaron Adler

(57) ABSTRACT

Provided herein are methods for reserving a parking space. In a user-implemented method, a user inputs a request into an electronic device to reserve one or more parking spaces and pays for the reservation. The reservation may be for a general parking space or for a specific parking space in a parking lot or garage. In another method the user inquiry is received as input and processed on an electronic device networked to a central cloud server comprising a distributed cloud computer system. A status of the parking space is displayed to the user in real time to which the user makes a reply. Also provided is a distributed e-parking space system able to execute instructions to receive input and, via a Distributed Internet Services system, to distribute an application or components to process input, deploy the distributed applications/components and synchronize data related to the reservation process.

2 Claims, 5 Drawing Sheets

(56) References Cited

U.S. PATENT DOCUMENTS

| | | | | |
|---|---|---|---|---|
| 2014/0019174 A1* | 1/2014 | Bhatt | ............ | G06Q 10/02 |
| | | | | 705/5 |
| 2014/0074523 A1* | 3/2014 | Turner | ............ | G06Q 10/02 |
| | | | | 705/5 |
| 2015/0066545 A1* | 3/2015 | Kotecha | ............ | G06Q 10/02 |
| | | | | 705/5 |

\* cited by examiner

SYSTEM AND METHOD FOR RESERVING A PARKING SPACE

CROSS-REFERENCE TO RELATED APPLICATIONS

This application is a nonprovisional under 37 C.F.R. § 1.119(e) of provisional application U.S. Ser. No. 61/940,751, filed Feb. 17, 2014, the entirety of which is hereby incorporated by reference.

BACKGROUND OF THE INVENTION

Field of the Invention

The present invention relates generally to the fields of distributed internet service system design and e-transactions for parking spaces. More specifically, the present invention relates to an electronic system for selling parking space.

Description of the Related Art

Currently, massive urban development and an increase in the number of automobiles on the roads has reduced the availability of parking making it a scarce resource in large urban cities, such as in China today. This results in a huge imbalance between the supply of parking spaces and the demand, particularly during peak travel times daily and/or seasonally.

Enhancing the utilization of parking spaces provides benefits and conveniences to the drivers, travelers, and travel service providers who are willing to pay extra to secure a guaranteed parking space at the time and location as desired. This extends to the drivers the benefits of reservation systems they have come to value in other modes of travel while increasing the revenue of parking space owners.

Thus, the prior art is deficient in a comprehensive reservation system that can sell each parking space in public parking lots prior to the physical arrival of a car and uses thereof. The present invention fulfills this longstanding need and desire in the art.

SUMMARY OF THE INVENTION

The present invention is directed to a user-implemented method for reserving a parking space in a parking lot on an electronic device having at least a processor, a memory and a network connection. The method comprises the steps of inputting a request to reserve one or more parking spaces into the electronic device and paying for the reservation. The present invention is directed to a related user-implemented method for reserving a parking space further comprising the step of occupying the reserved parking space. The present invention is directed to another related user-implemented method for reserving a parking space further comprising the step of paying for usage of the parking space.

The present invention also is directed to a distributed e-parking space system. The e-parking space system has at least one processor, at least one memory in communication with the processor and at least one network connection to an electronic device, said memory tangibly storing instructions, when executed by the processor are configured to receive an input comprising a user inquiry about availability of parking space in a parking lot over the network connection. Via a Distributed Internet Services (DIS) system, the processor-executable instructions are configured to distribute an application or components thereof configured to process the input that is located in an Asset Distributed Internet server to a target Edge Distributed Internet Server at one or more parking garages and to distribute an end-user application or components thereof targeted to the user inputting the inquiry to a Client Distributed Internet Server. The processor-executable instructions are configured to deploy the distributed application or components thereof at the targets and to synchronize any data on the Client Distributed Internet Server with the Asset Distributed Internet server in the distributed e-parking space system. The present invention is directed to a related distributed e-parking space system comprising further processor executable instructions to process the input with the deployed application or components thereof at the parking garage target and at the end-user client target to produce an output and to transmit the output over the network connection to the electronic device.

The present invention is directed further to a method for reserving parking space in a parking lot. The method comprises receiving a user inquiry to reserve parking space as input into an e-parking space application system on an electronic device networked to a central cloud server comprising a distributed cloud computer system and processing the inquiry with an application or components thereof distributed and deployed to a local server on the e-parking space application system from the central cloud server via a Distributed Internet Services system. A response to the inquiry comprising a status of the parking space is displayed to the user in real time and the user's reply to the status of the parking space is processed.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1:
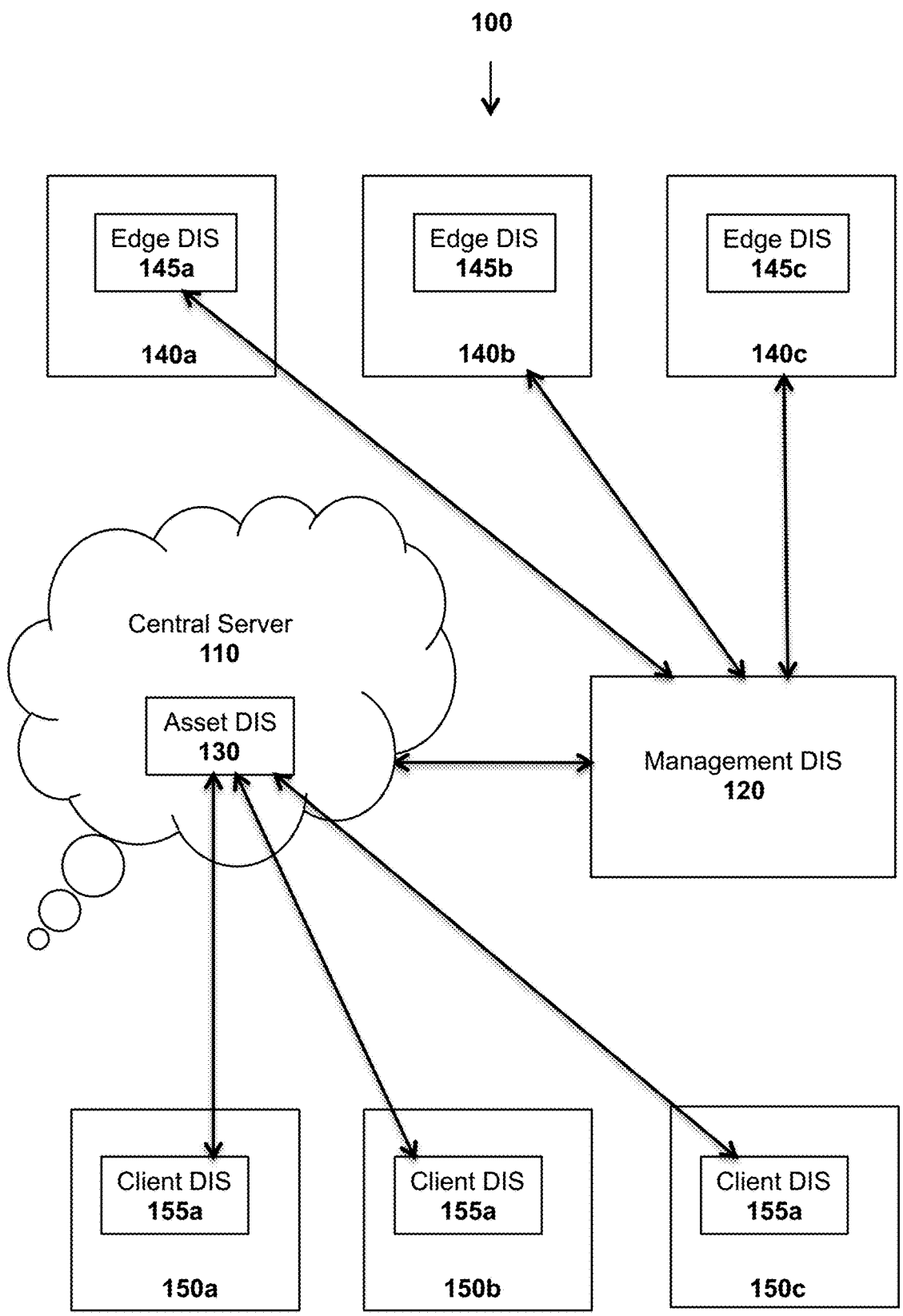
FIG. 1 is a diagram of the e-parking space system network architecture.

As used herein, the term, "a" or "an" may mean one or more. As used herein in the claim(s), when used in conjunction with the word "comprising", the words "a" or "an" may mean one or more than one. As used herein "another" or "other" may mean at least a second or more of the same or different claim element or components thereof. The terms "comprise" and "comprising" are used in the inclusive, open sense, meaning that additional elements may be included.

As used herein, the term "or" in the claims refers to "and/or" unless explicitly indicated to refer to alternatives only or the alternatives are mutually exclusive, although the disclosure supports a definition that refers to only alternatives and "and/or".

As used herein, the term "computer" generally includes: a processor, a memory, at least one information storage/retrieval apparatus such as, for example, a hard drive, a disk drive or a flash drive or memory stick, or other non-transitory computer readable media or non-transitory storage device, as is known in the art, at least one input apparatus such as, for example, a keyboard, a mouse, a point and touch device, a touch screen, or a microphone; and a display structure, such as the well-known computer screen. Additionally, the computer may include one or more network connections, such as wired or wireless connections. Such a computer or computer system may include more or less than what is listed above and encompasses other electronic media or electronic devices, as is known in the art, for example, but not limited to tablet computers or smart devices.

As used herein, the term "Distributed Internet Services system" refers to a distributed Internet service platform that transforms Internet applications to perform in various computing environments. A DIS system distributes Internet applications, including content, data and logic, to whatever extent appropriate and to any number and any kind of device across the network, via a Component Distribution Server/Asset Distribution Server. Through DIS, Internet applications can be hosted and managed centrally, with services based on each user's need, and cached and executed locally at the user device or nearby locations while maintaining its integrity. Any web-enabled computing device can be upgraded with the DIS software to become DIS-enabled to enjoy and perform distributed Internet services. The Distributed Internet Services system is completely described in any one of a family of patents of U.S. Pat. Nos. 7,136,857, 7,150,015, 7,181,731, 7,209,921, 7,430,610, 7,685,183, 7,685,577, 7,752,214, 8,326,883, 8,386,525, 8,443,035, 8,458,142, 8,458,222, 8,473,468, 8,527,545, 8,650,226, 8,666,933 and 8,713,062, all of which are commonly owned by OP40, Holdings, Inc., as is the instant application, and all of which are hereby incorporated by reference.

As used herein, the term "cloud" or "cloud computing" refers to a centralized and virtualized computing facility in which all the computing resources are shared there. One can no longer point to a specific machine for an application system or sub-system because they are all in the "cloud".

As used herein, the term "e-parking space reservation systems", "e-parking space system", "Sell My Parking Space" or the acronym "SMPS" are interchangeable.

As used herein, the acronym "DIS" refers to Distributed Internet Server. The acronym "MDIS" refers to Master Distributed Internet Server. The acronym "EDIS" refers to Edge Distributed Internet Server. The acronym "CDIS" refers to Client Distributed Internet Server. The acronym "ADIS" refers to Asset Distributed Internet Server. All MDIS, EDIS, CDIS, and ADIS are logic layers of the DIS software suite.

In one embodiment of the present invention there is provided a user-implemented method for reserving a parking space in a parking lot on an electronic device having at least a processor, a memory and a network connection, comprising the steps of inputting a request to reserve one or more parking spaces into the electronic device; and paying for the reservation.

Further to this embodiment the method comprises occupying the reserved parking space. In this further embodiment occupying the reserved parking space may comprise the step of receiving information and directions to the reserved parking space upon entry into the parking lot. Further yet to this embodiment the method comprises the step of paying for usage of the parking space. Particularly, the paying step may comprise finalizing total usage of the parking space that is the total time elapsed from paying for the reservation until exit from the parking lot. In an aspect the request for the parking space is inputted upon entry into the parking lot where paying is finalized upon exit from the parking space.

In this embodiment the inputting step may comprise receiving the request for a parking space; and determining if parking space is available or unavailable; wherein, if a space is available, outputting the information to the user or wherein, if the space is unavailable, offering to place the user on a waiting list. In an aspect the request may be for a specific parking space. Also in this embodiment the paying step may comprise inputting a period of time in which to arrive at the parking space; paying the fee for the requested reservation time period; and receiving confirmation of payment received.

In another embodiment of the present invention, there is provided distributed e-parking space system having at least one processor, at least one memory in communication with the processor and at least one network connection to an electronic device, said memory tangibly storing instructions, when executed by the processor are configured to a) receive an input comprising a user inquiry about availability of parking space in a parking lot over the network connection; and via a Distributed Internet Services (DIS) system, b) distribute an application or components thereof configured to process the input that is located in an Asset Distributed Internet server to a target Edge Distributed Internet Server at one or more parking garages; c) distribute an end-user application or components thereof targeted to the user inputting the inquiry to a Client Distributed Internet Server; d) deploy the distributed application or components thereof at the targets; and e) synchronize any data on the Client Distributed Internet Server with the Asset Distributed Internet server in the distributed e-parking space system. In a further embodiment the system comprises processor-executable instructions to process the input with the deployed application or components thereof at the parking garage target and at the end-user client target to produce an output; and transmit the output over the network connection to the electronic device.

In yet another embodiment of the present invention there is provided a method for reserving parking space in a parking lot, comprising receiving a user inquiry to reserve parking space as input into an e-parking space application system on an electronic device networked to a central cloud server comprising a distributed cloud computer system; processing the inquiry with an application or components thereof distributed and deployed to a local server on the e-parking space application system from the central cloud server via a Distributed Internet Services system; displaying a response to the inquiry comprising a status of the parking space to the user in real time; and processing the user's reply to the status of the parking space.

Further to this embodiment the method comprises displaying instructions and directions to the reserved parking space upon user's arrival at the parking lot. In this further embodiment the method comprises receiving as input the user's notice requesting exit from the parking lot; calculating usage exceeding the requested reservation time period upon exit from the parking space; processing the user's payment of any additional fees due; and sending a confirmation of payment to the user. In one aspect of these embodiment the inquiry may be for general parking and the status is available or unavailable. In an alternative aspect the inquiry may be for a specific parking space and the status is available, reserved, valid usage, or invalid usage.

In this embodiment and aspects thereof the user's reply may comprise reserving the parking space or requesting that the user's inquiry is placed on a waiting list. Further to this embodiment, the parking space may be reserved, where the method comprises processing a fee based on an inputted period of time for reservation of the parking space; and sending a confirmation of the reservation to the user. Alternatively, the user inquiry is placed on a waiting list, the method further comprising notifying the user when parking space becomes available; and processing the user's reply to reserve the parking space, to remain on the waiting list or to cancel the reservation.

Provided herein are e-parking space reservation systems, computer systems, platforms, models and applications and methods of use (Sell My Parking Space or SMPS system) that can sell each parking space in public parking lots prior to the physical arrival of a car. The SMPS system can work with current parking lot management systems, but utilizes the advanced Distributed Internet Service (DIS) technology to bring available parking spaces in various parking lots into a comprehensive reservation system, supporting the book-confirmation-transaction processes through multiple sales channels, similar to the e-ticketing systems used in many travel services (such as airline tickets, train tickets, hotel rooms, etc.). Alternatively, the SMPS system can work without an existing parking lot management system by providing all of the functions of such systems.

Distributed Internet Services System

Technically, DIS technology transforms a part of or the entire Internet application based on the differences between the computing environments of its hosting server and any targeted device, and proactively distributes, deploys, synchronizes the transformed application onto the targeted device across a wired or wireless network, and manages the entire life cycle of the distributed application. As a distributed middleware platform DIS enables an application, to the largest extent possible, to execute in a multi-tiered fashion across the network and makes it as close as possible to the end user. As such, it allows an internet application to be designed, deployed, hosted and managed centrally, but executed in a massively distributed fashion through the quality-guaranteed services across the network, wired and wireless, all the way to end-user's devices.

With the DIS platform, every element, i.e., digital asset or asset, of an application including content, logic and data is treated separately but uniformly. First the application is analyzed with the help of DIS utility tools so that every digital asset associated with the application is identified from the original hosting environment, i.e., the source. Then a packaging profile is generated for each asset that describes all necessary characteristics and service policies that are required for its distribution. Based on that profile, each asset is acquired, packaged and transformed into a neutral form, version-controlled and stored within the DIS repository. The application is thus "virtualized".

Next, based on the designated service requirements, each packaged asset is again transformed onto the targeted computing environment, distributed and deployed onto the target device via a Component Distribution Server/Asset Distribution Server. At that point, the distributed application is ready to use. Meanwhile DIS synchronizes the distributed version of the asset with the one at the source environment, in either direction, based on requirement defined by the application service policies.

The distribution, synchronization, deployment and purging can be done with any designated schedule and service policy for each specific asset based on the requirements to the integrity of the application, security and associated role in the application as well as the optimal use of network computing resources. For instance, one may adjust the amount and type of digital assets that are distributed to an end user device based on the characteristics of that device, the application and the network path. At the targeted device, i.e., target, the DIS manages the use of each distributed asset. The feedback may provide valuable information about the usage of the target-serviced applications.

The DIS platform serves each application based on pre-determined requirements defined in the application asset profiles. The profile describes each asset, its association, grouping and roles with various applications, as well as the required level of services and policies for every step of the life cycle of each asset. The profile can be updated in real-time, allowing service providers to leverage the entire network computing resources to best serve its customers' needs. The DIS platform software resides at various tiers of the network, communicates using its own virtual private network protocols among itself, and can be cascaded for scalability. Thus all service functions of the DIS platform are carried out at various nodes of the network in a distributed and robust fashion utilizing the computing resources across the network.

The Sell Inventory Approach

In the Sell inventory (SI) approach, it is assumed that a parking lot has a total number of X available parking spaces that can be sold or reserved. Under the SI approach, a space only has two statuses, i.e., available or unavailable (sold) as a number in inventory. Whether a space is sold or reserved is not distinguished, as a reservation customer begins to pay for the reserved space starting effective at the time of reservation. In either case, an available parking spot can be reserved for any length of time. Parking spaces can be sold for variable prices, depending on time of the day, day of the week, season, event, physical location (e.g. if closer to elevator or indoor), promotion coupons, frequent visitor discounts, co-marking discount or package price, senior or student discounts, etc.

At any moment, the system maintains the accurate number of parking spaces that can be sold, called "inventory". Once a car exits the parking lot and the driver pays the balance due, the space previously occupied by that car becomes available for sale. A space can be sold by either a car entering the parking lot or through an advanced online purchase. Once a space is sold, the total number of parking spaces will be reduced by one. When all parking spaces are sold, the SMPS system will notify an interested party that no parking spaces are available. The SMPS system will sell parking space only when there is an inventory available.

A parking space can be purchased either when a car enters a parking lot with available spaces or when a customer reserves a space in a parking lot with available spaces. If the latter, the reservation customer obligates himself to begin paying for the space at the time the reservation is made, regardless of whether it is physically occupied or not. There are two ways to purchase a parking space. The first is to purchase a fixed amount of time (also called paying for reservation, or PFR). The second is to purchase the actually occupied time (also called paying for usage, PFU). Once the space is physically occupied, the purchase will become the sum of both, i.e. reserved time plus occupied time. But the reserved time may be reduced if the physical occupation has occurred before the reservation time expires.

The e-parking space system can place a reservation on a waiting list. The e-parking space system also may charge for placing a reservation on a waiting list. A reservation on a waiting list does not guarantee an available parking space once it is needed, but will confer priority for the next available space. The e-parking space system may refund the buyer who is on waiting list, if the buyer decides to be withdrawn from the waiting list.

A buyer may buy a parking space from the e-parking space system by either having the car physically occupy the parking space or by paying in advance by pay a deposit This is similar to a traveler reserving a hotel room by providing a credit card for charging if the room inventory is in short supply, which guarantees the room's availability. When buying a Paying for Reservation (PFR) unit, a buyer decides the time period that he/she would like to purchase in advance as well as the Starting Time for the reservation. Usually the starting time begins at the time of purchasing. A Paying for Reservation unit can only be made when there is an inventory available. A space will be reserved for the purchased time period for the buyer once the transaction is confirmed. The Paying for Reservation expires at the end of the purchased time period. When the buyer with a Paying for Reservation unit enters the parking lot prior to its expiration, the purchase will become Paying for Usage (PFU). That is the actual purchase price is determined by the total elapsed time from the starting time of the Paying for Reservation unit.

When the car enters the parking lot without a paid reservation, the buyer is purchasing the actual usage, i.e. PFU, if an inventory is available. The starting time of the Paying for Usage will be the entering time registered on the e-parking space system and the time period will be the actual time elapsed from the starting time to the time when the car exits the parking lot. At the exiting time, the purchase is finalized and the inventory is available again in the e-parking space system.

The Sell Slot Approach

A slot is a physical parking space. Under the e-parking space context, selling a slot means selling a specific physical parking space for a time period. Under the sell slot approach, a space may have four different statuses: Available (available for sale), Reserved (sold by PFR), Valid Usage (sold by PFU), or Invalid Usage (wrongly occupied). The e-parking space system will rely on a monitoring and a display system for monitoring, displaying and communicating the status of each parking space. The e-parking space system assigns each available parking space with an identifiable mark, such as a number. Either Payment for Reservation or Payment for Usage can be associated with the mark.

The Combined Selling Approach

A parking lot can provide separate zones of parking spaces and sell inventories for each identifiable zone. For example, but not limited to, the zones closer to elevators would cost more than those farther away, or indoor parking spaces would cost more than those outdoors. A parking lot also can provide mixed parking space sales with some spaces sold via the sell slot approach where a user parks at a specific place and others sold via the sell inventory approach where a user parks at any available space.

The E-ticket Solution of SMPS

Similar to selling a hotel room, or a seat on a bus, train or airplane, selling a parking space in either sell inventory or sell slot approach can be accomplished by the DIS-enabled modern e-ticketing system that supports very large volume of real-time transactions across multiple sales channels. For example, U.S. Publication No. 2014-0229335-A1 to the inventor discloses a Distributed Cloud Services System for use in e-ticket commerce and transactions, the entirety of which is hereby incorporated by reference.

Purchasing/Reservation and Confirmation

A parking space in the SMPS system can be purchased via a smartphone application (APP), including PAD, a Voice Response System (VRS), SMS, Web, Public terminals (self service or human-assisted service), etc. Successful purchase of a parking space in the SMPS system can be confirmed via a 1D or 2D bar code by APP, email, multimedia SMS, etc; using SMS to send a text confirmation code; VRS provides confirmation code; or user selected RFID card, chip-based card, or bar-code based card.

For a paid reservation, a buyer must have an account established prior to the purchase or reservation and must have a valid payment method, for example, but not limited to, a valid credit card or other electronic means of payment, associated with the account. A paid reservation transaction results in a pre-authorized amount of charge. For a Pay for Usage transaction a user could use cash, card, pre-authorized account, etc. to make the payment. Sales records and receipts of a parking space sold/reserved in the e-parking space system is provided in the form of Email, APP, SMS, VRS, etc (not for reimbursement related transactions), on-site print-out, and/or regular mail.

Monitoring of and Direction to a Parking Space

The status of occupancy a physical parking space can be monitored by a number of conventional technologies, such as a video monitor supported by an imaging recognition system that can simply detect if a specific parking space is occupied or not. More over, the conventional technologies also can recognize the features of an automobile, such as brand, type, color and license plate. This information can be used to further identify the vehicle that occupies the space. All the monitors are part of a Monitor Management Subsystem (MMS) and all information from the monitors is sent to Monitor Management Subsystem that is part of the SMPS system. Further, using conventional technologies, a parking lot can be equipped with a simple display device at each parking space to show its status. All the displays are part of a Display Management Subsystem (DMS) that are a part of the e-parking space system as well.

As described below, the invention provides a number of advantages and uses, however such advantages and uses are not limited by such description. Embodiments of the present invention are better illustrated with reference to the Figure (s), however, such reference is not meant to limit the present invention in any fashion. The embodiments and variations described in detail herein are to be interpreted by the appended claims and equivalents thereof.

FIG. 1 depicts the e-parking space system network architecture. The relationship between the e-parking space application system (SMPS) 100 and the Distributed Internet Service (DIS) platform is as follows. The Asset Distributed Internet Server (ADIS) 130 is installed on the Central Server 110. Each Edge Distributed Internet Server (EDIS) represented by 145a,b,c is disposed at a parking garage 140a,b,c. Each Client Distributed Internet Server (CDIS) 155a,b,c is downloaded on the end-user's electronic device 150a,b,c, such as, but not limited to, a smart phone, tablet, PAD, PC or laptop, etc. The Master Distributed Internet Server (MDIS) 120 communicates reciprocally with the ADIS on the Central Server and communicates reciprocally with the EDISs at the parking lots. The CDISs communicate reciprocally with the Central Server/ADIS.

Users access the Central Server via web browser, mobile phone application, automobile on-board application, or any networked appliances with SMPS applications. The network may be any wired or wireless or combination of the networks. The Central Server provides availability, booking, confirmation, payment and space reservation as well as change, cancel reservation and other backend services, including, but not limited to, accounting, clearance, pricing engine, account maintenance, etc. The DIS platform provides the distribution and real-time synchronization services for guaranteed performance on space availability and reservation.

In the e-parking space application system, the application and associated data tables targeted for each parking garage are distributed to the Edge DIS installed at that garage. The end-user application and associated data tables targeted for each end-user are distributed to each Client DIS. The Distributed Internet Service (DIS) platform will dynamically and continuously synchronize the distributed application and data assets during the operation, 24 hours, seven days a week. Therefore, the DIS-based distributed cloud services enables the centralized design, development, deployment, maintenance and upgrade of the application system, individualized application and data for each parking garage and each user, and high-performance application without being unexpectedly disturbed or even disabled by the wireless network availability.

Figure 2:
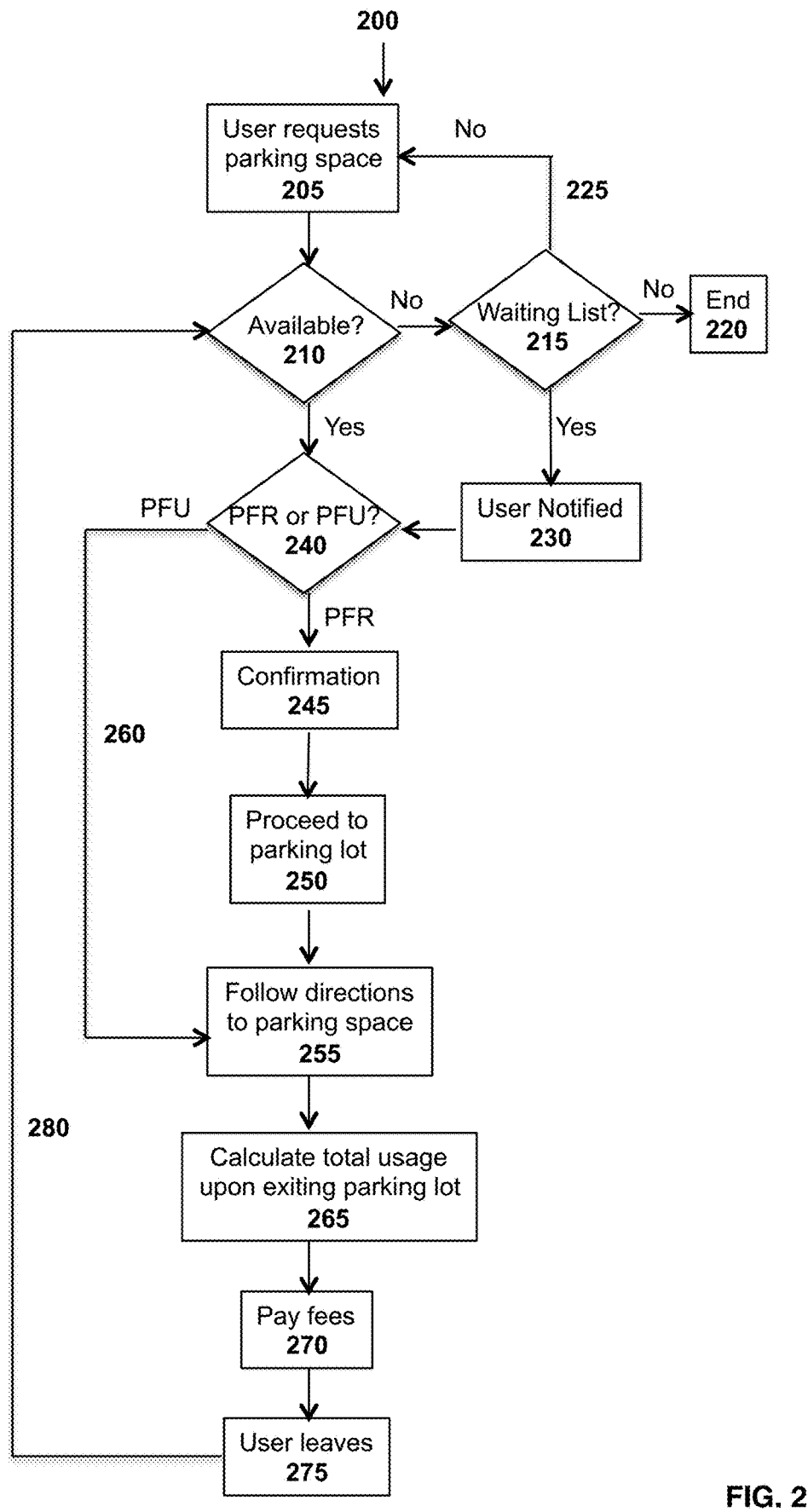
FIG. 2 is a flowchart illustrating the Sell Inventory method for reserving a parking space.

FIG. 2 illustrates the Sell Inventory (SI) 200 approach. A user inputs 205 a request into the e-parking space system for a parking space and availability 210 of a parking space is determined. If no space is available, the user is asked if the request should be placed 215 on a waiting list. If the user does not wish to be wait listed, the process ends 220. Alternatively, the user may then re-request 225 a parking space at any future time. If the user does wish to be placed on a waiting list, the user is notified 230 when the space is available. If a parking space is available, the user decides at 235 whether to purchase a Pay for Reservation unit or a Pay for Usage. If the user purchases 240 a Pay for Reservation this is time-stamped and the user receives confirmation 245 of the transaction over the e-parking space system. The user proceeds to the parking lot/garage before expiration of the time period in the PFR 250 and parks the vehicle in any available space as directed 255 by the monitoring system at the parking lot or garage. Alternatively, the user may be at the parking lot or garage when the request for a parking space is made and a Pay for Usage is purchased 260. When the user leaves the parking space. the e-parking space system calculates 265 the total usage fees. The fees are paid 270, the user leaves 275 the parking lot or garage and the space becomes available at 280 in the e-parking space system.

Figure 3:
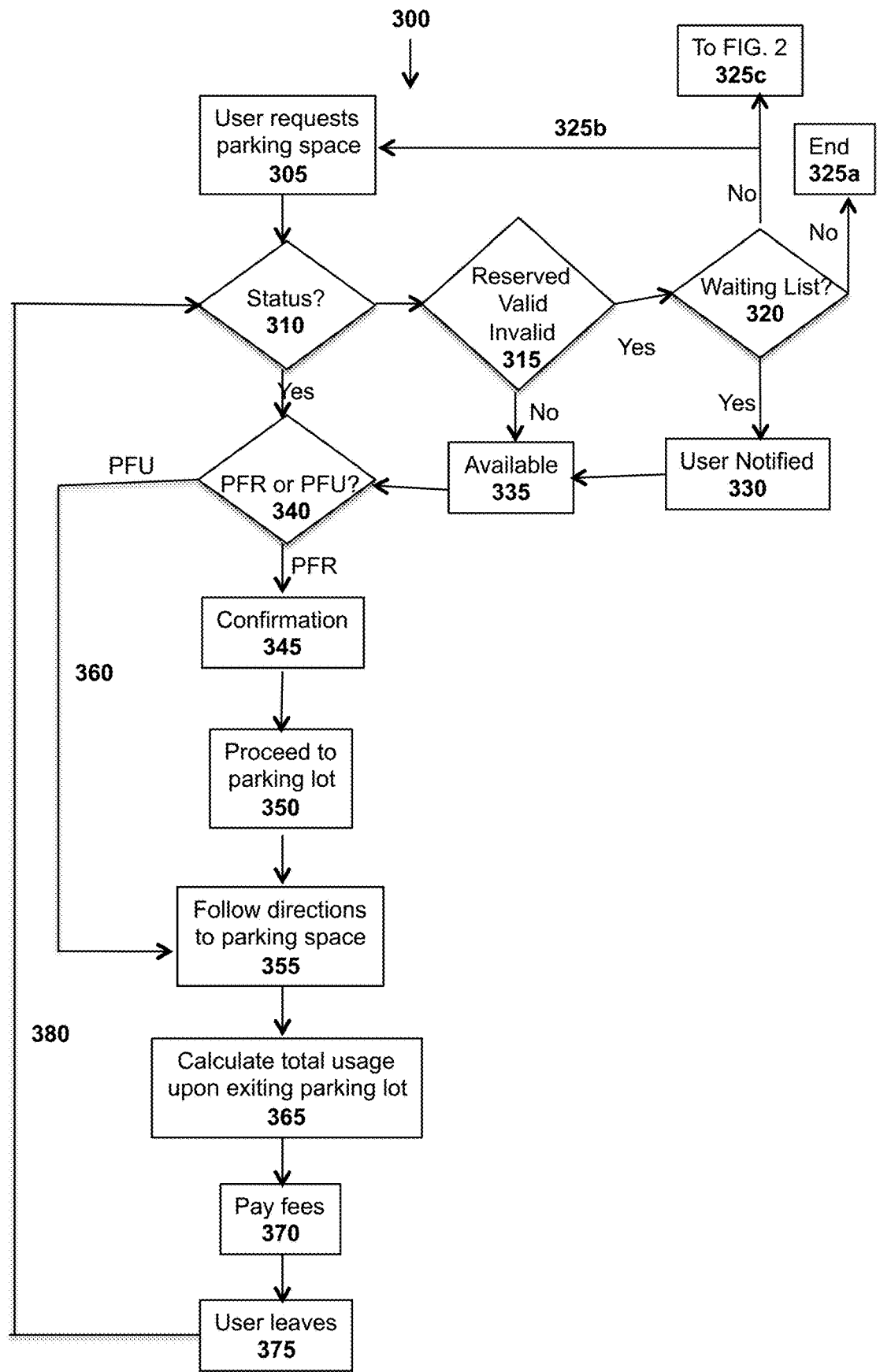
FIG. 3 is a flowchart illustrating the Sell Slot method for reserving a parking space.

FIG. 3 illustrates the Sell Slot (SS) 300 approach. A user inputs 305 a request into the e-parking space system for a specific parking space at a parking lot or garage and the status 310 of the space is determined. If the space is unavailable 315 because of a previous Pay for Reservation or is currently validly or invalidly in use, the user is asked if the request should be placed on a waiting list 320. If the user does not wish to be wait listed, the process either ends 325*a*, the user can request another specific parking space at 325*b* or request a parking space via the Sell Inventory method 325*c* as detailed in FIG. 2. If the user wants to be on a waiting list, the user is notified 330 when the parking space is available. If after the request is made and the status is available 335, the user decides at 340 whether to purchase a Pay for Reservation unit (PFR) or a Pay for Usage (PFU). If the user purchases a Pay for Reservation this is time-stamped and the user receives confirmation 345 of the transaction over the e-parking space system. The user proceeds to the parking lot/garage before expiration of the time period in the PFR 350 and parks the vehicle in any available space as directed 355 by the monitoring system at the parking lot or garage. Alternatively, the user may be at the parking lot or garage when the request for a parking space is made and a Pay for Usage is purchased 360. When the user leaves the parking space. The e-parking space system calculates 365 the total usage fees. The fees are paid 370, the user leaves 375 the parking lot or garage and the space becomes available at 380 in the e-parking space system.

Figure 4:
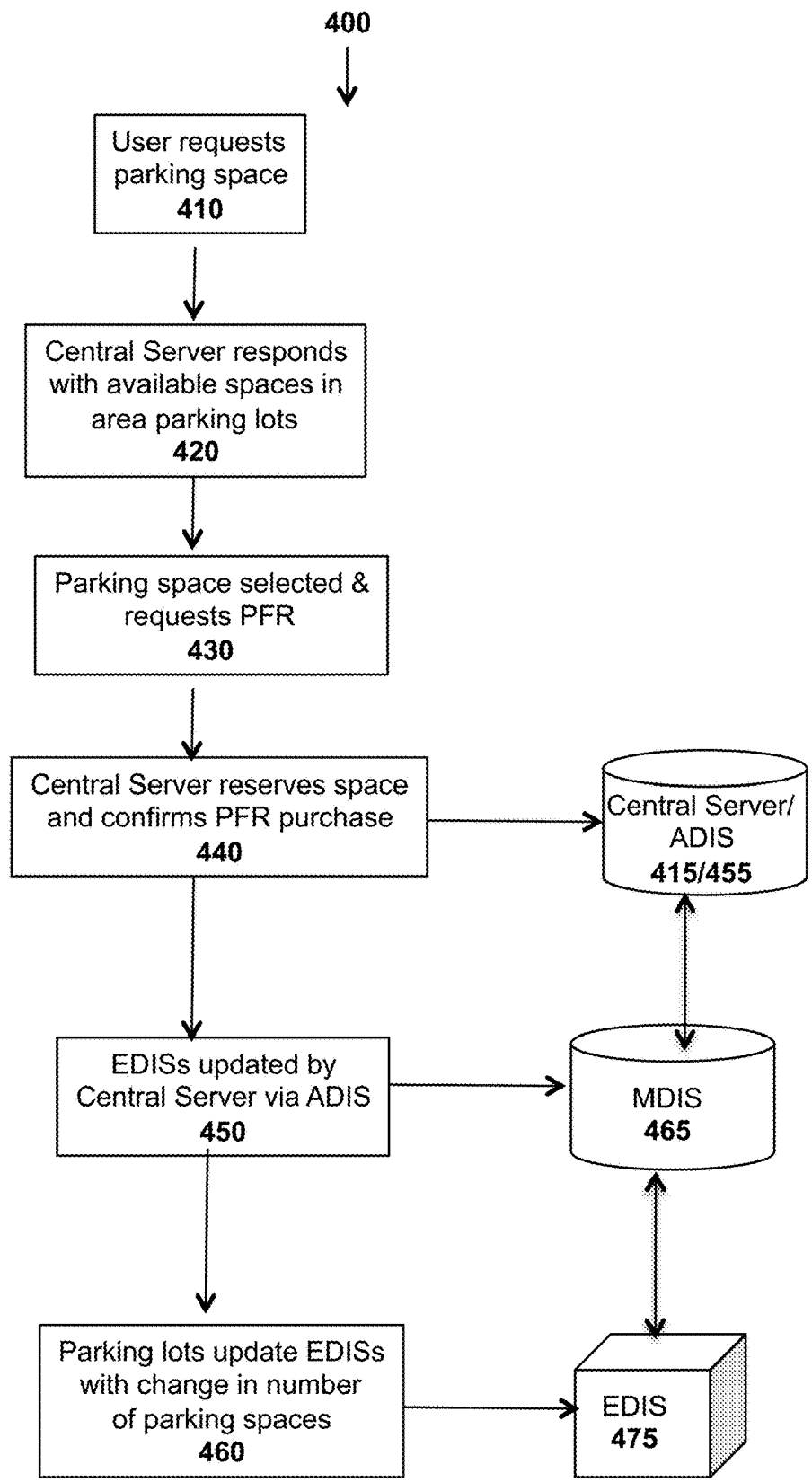
FIG. 4 is a flowchart illustrating the Sell Inventory method through the Distributed Internet Server.

FIG. 4 illustrates the Sell Inventory approach 400 via the Distributed Internet Server. A user sends an inquiry 410 to the Central Server 415 for space availability in a desired parking area. The Central Server responds 420 with the number of spaces available in each parking lot in the area. The user selects a parking lot and requests a space for Pay for Reservation 430 within that parking lot. The Central Server reserves a space in the parking lot, the user makes a payment and receives confirmation at 440. The user also may request other services, such as canceling a reservation. The Central Server with the Asset DIS 455 through the Master DIS 465 updates 450 the Edge DISs, represented by 475, of the parking lots, the number of spaces reserved or released, for example, when a reservation is canceled. The parking lots update 460 the EDIS for the number of parking space changed, such as when a car leaves the parking lot, or a car enters into the parking lot without a reservation.

Figure 5:
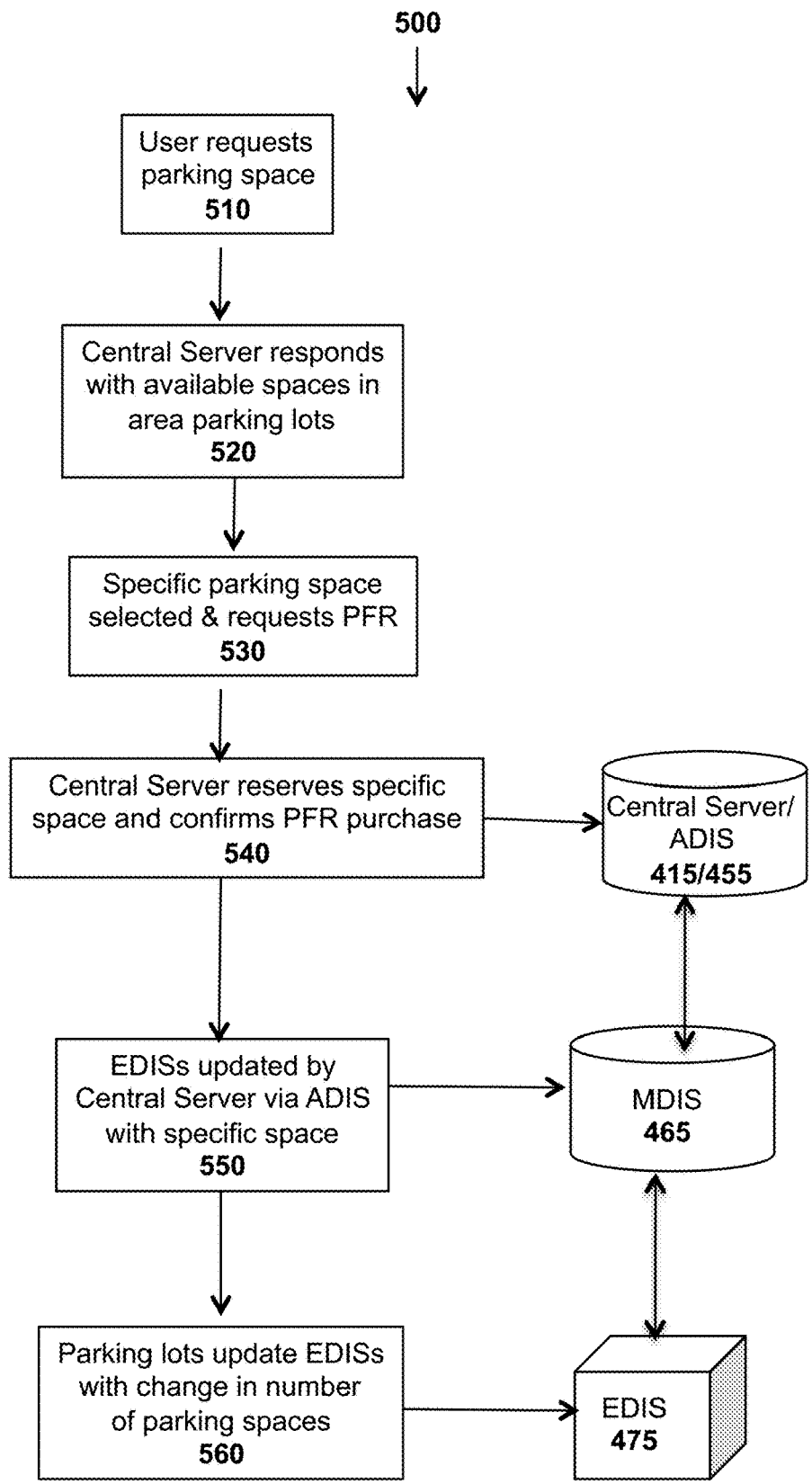
FIG. 5 is a flowchart illustrating the Sell Slot method through the Distributed Internet Server.

With continued reference to FIG. 4, FIG. 5 illustrates the Sell Slot approach 500 via the Distributed Internet Server. A user sends an inquiry 510 to the Central Server 415 for space available for a desired area of parking. The Central Server responds 520 with all the parking spaces available in each parking lot in area. The user selects the specific parking space in a parking lot and requests a Pay for Reservation 530. The Central Server reserves the space, the user makes payment and receives confirmation at 540. The user also may request other services, such as canceling a reservation. The Central Server with the Asset DIS 455 through the Master DIS 465 updates 550 the Edge DIS 475 of the parking lot with the specific lot reserved or released for example, when a reservation is canceled. The parking lot updates 560 the EDIS for all the parking lots of a changed status, such as when a car leaves the parking lot, or a car enters into the parking lot without a reservation.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed:

1. A distributed e-parking space system for reserving a parking space at a parking garage, comprising:
   at least one processor;

at least one memory in communication with the processor; and at least one network connection from a central cloud server to an electronic device at an end-user location, said memory tangibly storing instructions, which when executed by the processor are configured to:
a) receive over the network connection an input from the electronic device at the end-user location to the central cloud server, said input comprising an inquiry about availability of one or more parking spaces in general parking in a parking garage;
b) distribute via a Distributed Internet Services (DIS) system:
an application or components thereof configured to process the input located in an Asset Distributed Internet server to a target Edge Distributed Internet Server, each of said servers comprising the Distributed Internet Services system, at the parking garages;
an end-user application or components thereof targeted to the electronic device inputting the inquiry to a Client Distributed Internet Server comprising the Distributed Internet Services system;
c) deploy the distributed application or components thereof at the target Edge Distributed Internet Server and the end-user application or components thereof at the electronic device;
d) output to the electronic device at the end-user location an availability information for the parking space in general parking and make a reservation or an unavailability information for the parking space in general parking and an offer to be placed on a waiting list; and
e) synchronize any data on the Client Distributed Internet Server with the Asset Distributed Internet server in the distributed e-parking space system.

2. The distributed e-parking space system of claim 1, comprising further processor executable instructions to:
process the input with the deployed application or components thereof at the parking garage target and at the end-user client target to produce an output; and
transmit the output over the network connection to the electronic device.

* * * * *